United States Patent
Fervel et al.

(10) Patent No.: US 8,600,583 B2
(45) Date of Patent: Dec. 3, 2013

(54) DISTRIBUTED FLIGHT CONTROL SYSTEM

(75) Inventors: Marc Fervel, Toulouse (FR);
Jean-Jacques Aubert, Pibrac (FR);
Antoine Maussion, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 403 days.

(21) Appl. No.: 12/865,949

(22) PCT Filed: Feb. 4, 2009

(86) PCT No.: PCT/FR2009/050166
§ 371 (c)(1),
(2), (4) Date: Jan. 25, 2011

(87) PCT Pub. No.: WO2009/101324
PCT Pub. Date: Aug. 20, 2009

(65) Prior Publication Data
US 2011/0118906 A1     May 19, 2011

(30) Foreign Application Priority Data

Feb. 8, 2008   (FR) ..................................... 08 50806

(51) Int. Cl.
*G01C 23/00*     (2006.01)
(52) U.S. Cl.
USPC ................... 701/3; 701/14; 701/16; 701/120; 340/961; 340/426.11; 340/686.3; 340/870.11; 244/195; 244/194; 244/76 R; 244/23 A
(58) Field of Classification Search
USPC ................................................ 701/3, 16, 20
See application file for complete search history.

(56) References Cited

U.S. PATENT DOCUMENTS

| | | | | |
|---|---|---|---|---|
| 5,475,818 A | * | 12/1995 | Molyneaux et al. | 709/208 |
| 5,483,230 A | | 1/1996 | Mueller | |
| 2003/0195673 A1 | * | 10/2003 | Foch et al. | 701/3 |
| 2005/0165959 A1 | * | 7/2005 | Huff | 709/238 |
| 2005/0187677 A1 | * | 8/2005 | Walker | 701/16 |
| 2007/0271010 A1 | | 11/2007 | Kossentini | |
| 2009/0110030 A1 | * | 4/2009 | Kennedy et al. | 375/130 |

FOREIGN PATENT DOCUMENTS

| | | |
|---|---|---|
| EP | 0 594 144 | 4/1994 |
| EP | 1 353 247 | 10/2003 |
| FR | 2 901 379 | 11/2007 |

OTHER PUBLICATIONS

U.S. Appl. No. 13/255,778, filed Sep. 9, 2011, Fervel, et al.
U.S. Appl. No. 13/255,406, filed Sep. 8, 2011, Fervel, et al.

* cited by examiner

*Primary Examiner* — Redhwan K Mawari
(74) *Attorney, Agent, or Firm* — Oblon, Spivak, McClelland, Maier & Neustadt, L.L.P.

(57) ABSTRACT

A flight control system for an aircraft, controlling a plurality of actuators adapted to actuate control surfaces of the aircraft, including: at least one communications bus; at least one computer situated in the avionics bay of the aircraft, and adapted to calculate flight commands and to transmit them over the bus in the form of command messages; and at least a first remote terminal connected to the bus, adapted to control a control surface actuator, and to acquire the state of the actuator from information provided by at least a first sensor, the first terminal receiving command messages from the computer and transmitting electrical orders to the actuator as a function of the command messages received in this way, and also transmitting messages to the computer, at its request, relating to the state of the actuator as a function of the information provided by the first sensor.

17 Claims, 9 Drawing Sheets

DISTRIBUTED FLIGHT CONTROL SYSTEM

TECHNICAL FIELD

The present invention relates in general to flight control systems in the field of aeronautics.

STATE OF THE PRIOR ART

The flight control system of an aircraft constitutes the connection between the pilot control members (joystick, pedals, etc.) and the aerodynamic control surfaces. Modern airliners possess "fly-by-wire" control systems in which the mechanical action taken on the pilot control members are converted into analog signals that are transmitted to actuators that move the control surfaces.

Figure 1:
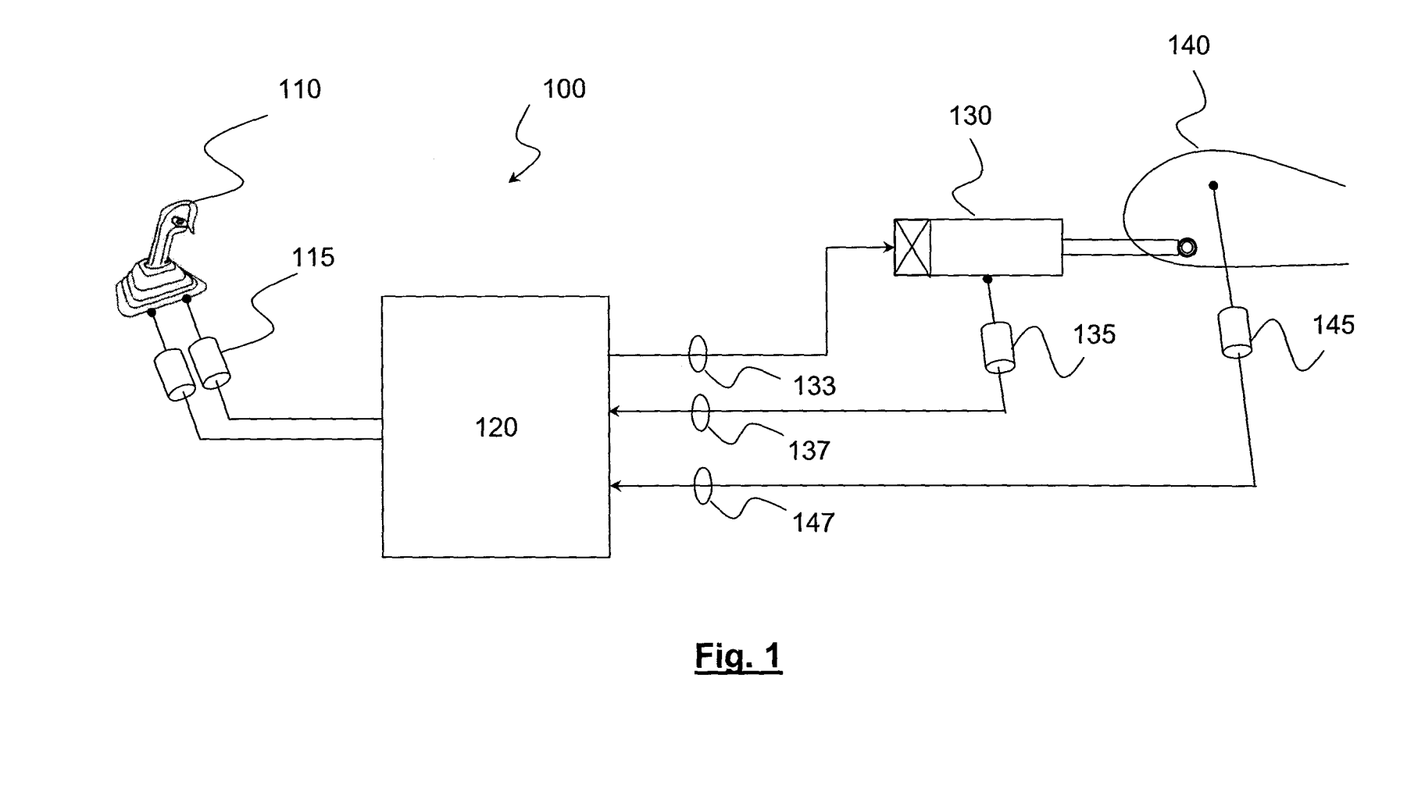
FIG. 1 is a diagram of a flight control system that is known in the state of the art.

FIG. 1 shows a flight control system 100 as known in the state of the art. There can be seen a pilot control member 110, e.g. a joystick, fitted with one or more sensors 115, e.g. position sensors and/or angle sensors that provide position and/or angular orientation information to the flight control computer 120. On the basis of information received from the various pilot control members 110, and/or from the autopilot, the computer 120 determines the flight commands to be applied to the actuators 130. Typically, these actuators are electric motors or hydraulic actuators controlled by solenoid valves, and they act on the aerodynamic control surfaces 140 of the aircraft. The actuators 130 and the aerodynamic control surfaces 140 are fitted with respective sensors referenced 135 and 145. These sensors inform the computer 120 about the positions and/or angular orientations of the moving elements of the actuators and also of the control surfaces. For example, a sensor 135 may give the position in translation of an actuator, and a sensor 145 may give the angular orientation of a flap.

The computer 120 possesses both a control function and a monitoring function. It is connected to the actuators by first cables 133 for transmitting analog control signals. It is also connected to the sensors 135 and 145 fitted respectively to the actuators and to the control surfaces themselves via second cables 137 and via third cables 147. Thus, at all times, it can monitor the state of the actuators and verify that commands have indeed been executed.

The above-described flight control system nevertheless presents a certain number of drawbacks. Firstly, it requires a large number of cables between the computer and all of the actuators and control surfaces. This number is made all the greater given that the number of inputs/outputs of actuators is constantly increasing because of their increasing complexity. The high number of cables makes installation complex and control testing particularly lengthy. Furthermore, the ever-increasing use of composite materials instead of metal in aircraft construction makes flight control cables more sensitive to lightning and to electromagnetic disturbances, especially when the cables are particularly long. This makes it necessary to provide shielding for the cables, or indeed outer shielding together with more effective protection for the electronics of the computer.

The increase in the number of cables and in the thickness of the shielding harms the weight budget of the aircraft. It also leads to harnesses of greater diameter that are difficult to route through the aircraft, in particular in confined zones, thereby leading to structural constraints.

Similarly, overdimensioning the computer in terms of numbers of inputs/outputs and in terms of electrical protection also impacts the weight budget of the aircraft and the size of the avionics bay.

The object of the present invention is to propose a flight control system that is robust and that remedies the above-mentioned drawbacks, and in particular that does not require recourse to a large amount of cabling nor to constraining electromagnetic protection shielding.

SUMMARY OF THE INVENTION

The present invention is defined by a flight control system for an aircraft, for controlling a plurality of actuators adapted to actuate control surfaces of said aircraft, the system comprising:
- at least one communications bus;
- at least one computer situated in the avionics bay of the aircraft, and adapted to calculate flight commands and to transmit them over said bus in the form of command messages; and
- at least a first remote terminal connected to said bus, adapted to control a control surface actuator, and to acquire the state of said actuator from information provided by at least a first sensor fitted thereto, said first terminal receiving command messages from the computer and transmitting electrical orders to the actuator as a function of the command messages thus received, and also transmitting messages to the computer, at the request thereof, relating to the state of the actuator as a function of the information provided by said first sensor.

In an advantageous embodiment, the bus is constituted by a differentially-powered twisted pair, exchanges over the bus being performed in half-duplex mode and using a master-slave type protocol.

The system may also comprise at least one second remote terminal connected to said bus and adapted to acquire the state of a control surface from information provided by a second sensor fitted thereto, and also adapted to transmit messages to the computer, at the request thereof, relating to the state of said control surface as a function of information provided by said second sensor.

The first terminal may also be adapted to acquire the state of a control surface moved by said actuator from information provided by at least one second sensor fitted thereto, and also being adapted to transmit messages to the computer, at the request thereof, relating to the state of said control surface as a function of information provided by said second sensor.

In a first variant, said computer comprises:
- a first channel (COM) for computing flight commands, for sending them in the form of command messages to a plurality of said first terminals, and for receiving acknowledgments of receipt from the terminals and also for sending requests to the terminals in order to obtain in return the respective states of the actuators controlled by the terminals and of the control surfaces moved by the actuators; and
- a second channel (MON) serving to calculate flight commands and to transform them into command messages, and to listen to and to record the messages passing over the bus, coming from and going to said first channel;
- the command messages of the first channel being compared with the command messages of the second channel.

In a second variant, the system has a single bus and said computer comprises:
- a first channel (COM) for computing flight commands, for sending them in the form of command messages to a plurality of said first terminals, and for receiving acknowledgments of receipt from the terminals and also for sending requests to the terminals in order to obtain in return the respective states of the actuators controlled by the terminals and of the control surfaces moved by the actuators, said first channel being connected to said bus via a connection that is controlled by means of a bus controller (BC); and a second channel (MON), connected to said controller and serving to calculate flight commands and to transform them into command messages, and to listen to and to record the messages passing over the bus, coming from and going to said first channel; and the command messages of the first channel being compared with the command messages of the second channel.

In a third variant, the system has a single bus and said computer comprises:

a first channel (COM) for computing flight commands, for sending them in the form of command messages to a plurality of said first terminals, and for receiving acknowledgments of receipt from the terminals and also for sending requests to the terminals in order to obtain in return the respective states of the actuators controlled by the terminals and of the control surfaces moved by the actuators, said first channel being connected to said bus via a connection that is controlled by means of a bus controller (BC); and a second channel (MON) connected to said first channel and serving to calculate flight commands and to transform them into command messages, to receive messages from and to said first channel, relayed thereby to the second channel;

the command messages of the first channel being compared with the command messages of the second channel.

The first terminal advantageously comprises:

a first channel (COM) for receiving command messages from said computer, for acknowledging receipt thereof, and for transmitting electrical orders to the actuator controlled by said terminal; and a second channel (MON) for receiving requests from said computer and for returning messages relating to the state of said actuator and/or the state of a control surface moved thereby.

Preferably, said first and second channels of the computer and said first and second channels of the first terminal are connected to a single bus.

The first channel of the computer may have a bus controller (BC) in series with a transceiver (Tc) and a transformer (Tf) providing coupling with the bus, the second channel of the computer may comprise a bus monitor module (BM) in series with a transceiver (Tc) and a transformer (Tf) providing coupling with the bus, and each of the first and second channels of the first terminal may comprise a control module (RT) in series with a transceiver (Tc) and a transformer (Tf) providing coupling with the bus.

Alternatively, said first channels of the computer and of the first terminal are connected to a first bus and said second channels of the computer and of the first terminal are connected to a second bus.

Under such circumstances, each of said first and second channels of the computer comprises a bus controller (BC) in series with a transceiver (Tc) and a transformer (Tf) providing coupling with the first and second buses, respectively, and each of the first and second channels of the first terminal comprises a control module (RT) in series with a transceiver (Tc) and a transformer (Tf) providing coupling with the first and second buses, respectively.

Also alternatively, the first channel comprises a bus controller in series with two first branches in parallel, each first branch comprising a transceiver in series with a transformer for coupling respectively with a first bus and with a second bus, the second channel comprises a monitor module in series with two second branches in parallel, each second branch comprising a receiver in series with a transformer for providing coupling with said first and second buses, respectively, and each of the first and second channels of the first terminal comprises a control module in series with two third branches in parallel, each third branch comprising a transceiver in series with a transformer for providing coupling with said first and second buses, respectively.

Finally, the invention provides an aircraft including a plurality of control surfaces adapted to be operated by actuators, together with a flight control system as set out above.

BRIEF DESCRIPTION OF THE DRAWINGS

Other characteristics and advantages of the invention appear on reading a description of a preferred embodiment of the invention given with reference to the accompanying figures, in which.

DETAILED DESCRIPTION OF PARTICULAR EMBODIMENTS

The idea on which the invention is based is to use a distributed flight control system that is organized about a multiplexed communications bus, and in which the control functions and some of the monitoring functions are performed remotely at the actuators.

Figure 2A:
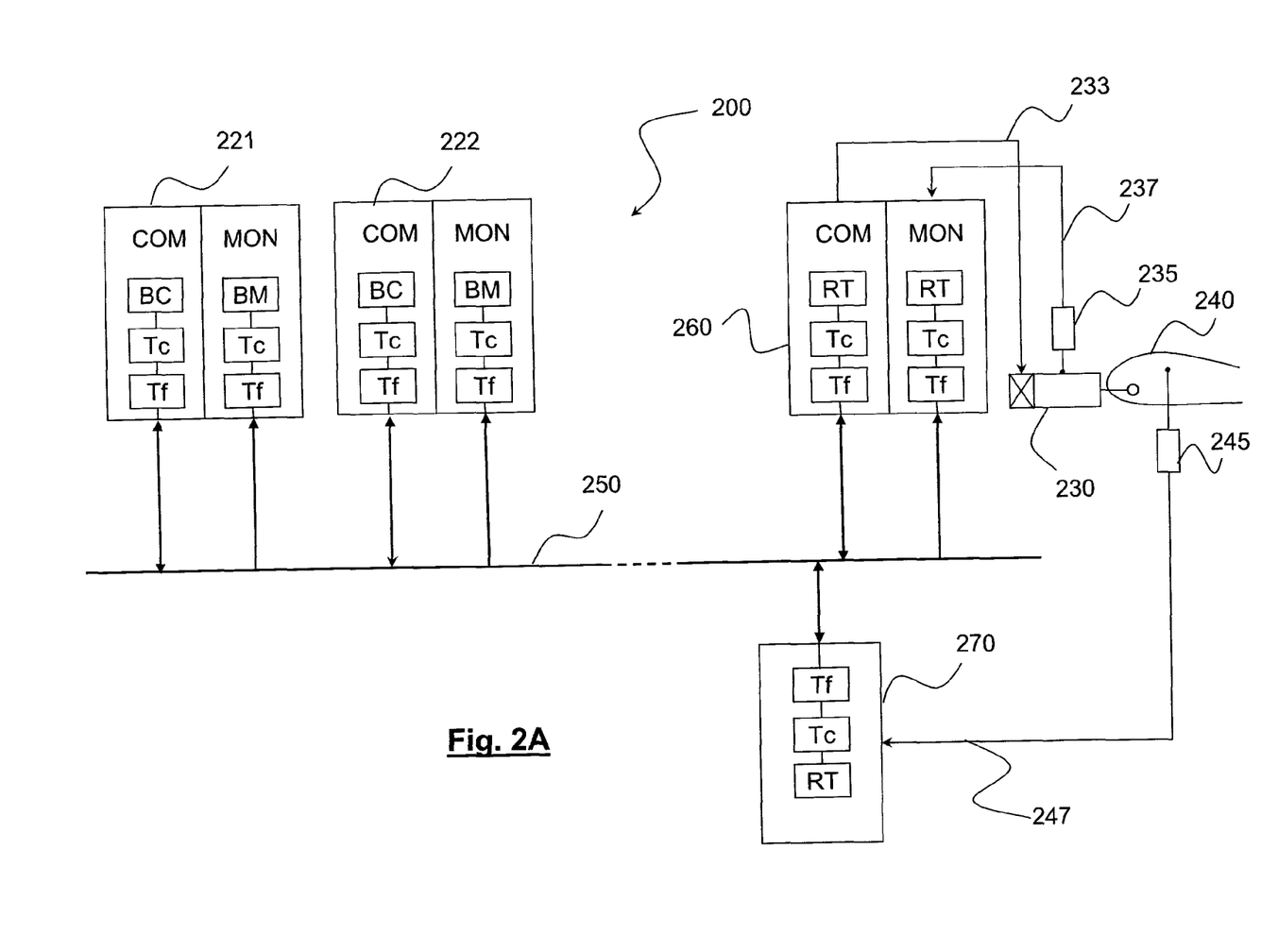
FIGS. 2A to 2C are diagrams of three variants of a flight control system in a first embodiment of the invention.

FIG. 2A shows a flight control system 200 in a first embodiment of the invention. It comprises a first control computer 221 referred to as a "primary" computer, and a second flight control computer 222, referred to as a "secondary" computer. The primary and secondary computers have the same structure and they are situated in the avionics bay of the aircraft. In practice, the flight control system generally has at least two pairs of primary and secondary computers, a first pair being situated on the port side and a second pair being situated on the starboard side of the aircraft, thereby providing physical redundancy in the control of control surfaces. The primary and secondary computers are connected to the pilot control members and/or to the autopilot as in the prior art. The primary and secondary computers receive position and/or angular orientation information from said members by means of sensors with which they are fitted (not shown).

Each computer has two channels: a first channel referred to as the COM channel, and a second channel referred to as the MON channel.

In normal operation mode, i.e. when the primary computer is not suffering a breakdown, its COM channel listens to and controls the bus. More precisely, it transmits command messages to terminals that are subscribers to the bus 250 and in return it receives information or confirmation messages, as described in detail below. The MON channel merely listens to the bus and verifies consistency between the command messages as sent by the COM channel and the information or confirmation messages as returned thereto by the various terminals. In other words, its function is to monitor proper operation of the COM channel. The MON channel preferably makes use of a calculation algorithm that is distinct from that of the COM channel so as to avoid systematic errors that might otherwise occur in both channels. The COM and MON channels of the secondary computer perform the same roles as the COM and MON channels of the first computer. Nevertheless, in normal operation, the COM channel of the secondary computer is inhibited from emitting over the bus 250.

If a malfunction affects the COM channel of the primary computer, then its MON channel detects the malfunction and deactivates the computer. Simultaneously, the secondary computer is activated, i.e. control of the bus by the COM channel of the secondary computer is de-inhibited. Given that the COM channel of the secondary computer calculates in parallel with the primary computer prior to breakdown, there is no need to recover the respective states of all of the actuators and control surfaces. Takeover in the event of a breakdown of the primary computer consequently takes place immediately.

A COM channel of the primary computer or of the secondary computer comprises a bus controller BC providing both-way access to the bus, a transceiver Tc and a transformer Tf providing coupling with the bus 250. In similar manner, a MON channel of the primary computer or of the secondary computer comprises a bus monitor module BM giving one-way access (in reception only), a transceiver Tc (operating as a receiver only in this configuration), and a transformer Tf providing coupling with the bus 250. It can be understood that if the secondary computer 222 is activated as a result of a breakdown of the primary computer, the monitor module BM of the COM channel of the secondary computer is reconfigured as a control module BC.

The bus 250 is a multiplexed digital serial bus. The term "digital bus" is used to mean that the signals traveling over the bus can take two states, e.g. bipolar signals representing binary values. The term "multiplexed" is used to mean that messages are transmitted over the bus using a time-division multiplexing scheme. In practice, the bus is implemented as a single twisted pair.

In a preferred embodiment, message exchanges over the bus 250 are performed in half-duplex mode using a deterministic communications protocol of the master-slave type. More precisely, in normal operation, the bus controller BC of the COM channel of the primary computer is the master of the bus. Message exchanges are necessarily initiated by the master of the bus, and a remote terminal can send only in response to a prior indication from the master.

The communications bus 250 is advantageously in the form of a differentially-powered twisted pair that is electrically isolated from ground and from power supply potentials. This characteristic gives the bus a high degree of insensitivity to electromagnetic disturbances, in particular those caused by lightning. Standard MIL-STD-1553B defines a bus that operates both with a master-slave type protocol and that possesses a differential power supply. By way of example, a description of the standard can be found at the following site:
www-corot.obspm.fr/COROT-ETC/Files/1553_overview.pdf Alternatively, the bus may comply with the ARINC 629 standard that also recommends a master-slave type protocol and a differential power supply.

In order to make provision against transmission errors, the messages transmitted over the bus 250 are advantageously using a cyclic redundancy check (CRC) code, or indeed an error correcting code (ECC). Alternatively, or in addition, messages are signed using a digital signature. The digital signature may be generated in known manner by applying a hashing function to the message for transmission in order to obtain a digital fingerprint, which fingerprint is subsequently encrypted using the private key of the sender, e.g. a private key forming part of an asymmetric (private) key infrastructure (PKI). It is thus possible for the addressee of the message, in particular the MON channel of a computer, to verify the integrity of the message, i.e. to determine whether or not it has been corrupted.

The flight control system 200 also includes a plurality of terminals 260, each terminal 260 being dedicated to controlling and to monitoring a particular actuator 230. Each terminal 260 comprises a "COM" first channel and a "MON" second channel. The COM channel of the terminal 260 receives command messages from the primary computer (or the secondary computer if the primary computer has failed) and it transmits control orders to the associated actuator 230 over at least a first cable 233, e.g. it transmits a position or a hydraulic pressure setpoint value. The MON channel of the terminal acts via at least one second cable 237 to acquire information relating to the state of the actuator, e.g. position, pressure, temperature, etc. information as provided by one or more sensors with which the actuator is fitted. On request of the primary computer, the MON channel of the terminal 260 sends messages to the COM channel of the computer that relate to the state of the actuator. The first and second cables are relatively short because of the proximity of the terminal with the associated actuator, thus reducing the amount of cabling and reducing the sensitivity of the transmitted signals to electromagnetic disturbances.

Each of the COM and MON channels of a terminal 260 has a respective remote terminal (RT) control module, a transceiver Tc and a transformer Tf providing coupling with the bus 250. The control module RT of the COM channel controls the sending of electrical orders to the actuator, the receiving of command messages from the COM channel of the computer, and also the sending of confirmation messages thereto. In similar manner, the RT module of the MON channel controls the transmission of state messages in response to requests from the computer.

The primary computer 221 transmits command messages in succession to the various terminals 260. Each terminal 260, and more particularly its COM channel, that receives a command message, responds thereto correctly by returning an acknowledgment of receipt to the computer, and more precisely to its COM channel.

When the primary computer seeks to know the state of an actuator (e.g. its position, its pressure, its temperature, etc.), its COM channel sends a request to the terminal 260 associated with said actuator, and more precisely to its MON channel. The MON channel replies to the COM channel of the computer by sending an information message relating to the state of the actuator in question.

In the first embodiment of the invention, the flight control system also comprises a plurality of terminals 270, each terminal being dedicated to monitoring a particular control surface 273. Each terminal 270 is connected to a sensor measuring the position or the angular orientation of the associated control surface by means of a cable that is relatively short, thus presenting the same advantages as described above. Each terminal 270 has a control module RT, a transceiver module Tc, and a transformer Tf providing coupling with the bus 250.

When the primary computer seeks to know the state of a control surface (e.g. its position or its angular orientation), its COM channel sends a request to the terminal 270 associated with said control surface. The terminal 270 replies by transmitting an information message relating to the state of the control surface in question.

The flight control system of the invention is robust against the various types of breakdown that it might suffer.

When messages are exchanged between the primary computer and a plurality of terminals, the MON channel of the computer listens to and records the command messages sent over the COM channel of the computer and the responses from the interrogated terminal.

If the command messages sent by the COM channel differ from the command messages heard by the MON channel, over some predetermined number of occurrences, then it is to be concluded that the bus controller BC or the bus monitor module BM of the primary computer has broken down. The primary computer is then deactivated and the secondary computer is activated, in other words its COM channel takes control of the bus.

Even when no error is detected by comparing the COM and MON channels of the primary computer, the messages received by a terminal 260 or 270 might have suffered errors due to noise on the bus. These errors can be detected by the RT module using the CRC code (e.g. a parity bit), or by integrity verification on the basis of the digital signature of the message, or indeed on the basis of the message as corrected by means of an error correcting code (ECC) present in the message. Furthermore, the primary computer may request the terminal 260 or 270 to return the command message that was sent thereto, as an acknowledgment of receipt. If the primary terminal detects a difference between the command message as transmitted and the acknowledgment of receipt, over some predetermined number of occurrences, then the faulty terminal 260 is deactivated.

Several types of breakdown may affect a terminal 260 associated with an actuator.

Firstly, the breakdown may affect its COM channel. In a first breakdown scenario, the terminal 260 does not send an acknowledgment of receipt to messages sent thereto by the (primary or secondary) computer. The bus controller BC of the computer then deactivates the faulty terminal after some predetermined number of unsuccessful transmission attempts. In a second breakdown scenario, the terminal 260 may transmit an erroneous order or the associated actuator. Its MON channel will then, at the request of the computer, transmit an actuator state that is not compatible with the message that was sent to its COM channel. In addition, the terminal 270 that tracks the position/orientation of the control surface moved by said actuator will deliver information that is incompatible with the command sent by the computer. Either way, if incompatibility is detected over some predetermined number of occurrences, then the terminal 260 is deemed to have failed and is deactivated. In a third breakdown scenario, the COM channel of the terminal disturbs the bus by sending messages continuously or incoherently over the bus (a phenomenon known as "babbling"). If the primary (or secondary) computer detects transmission of this type, then the faulty terminal 260 is deactivated.

In the same manner, the three breakdown scenarios described above apply similarly to the MON channel of the terminal 260. Firstly, the MON channel may fail to respond to requests from the computer. If the COM channel of the computer does not receive a response for some predetermined number of occurrences, then the terminal 260 is deactivated. Secondly, the MON channel of the terminal may transmit an erroneous actuator state. If the COM channel of the computer detects inconsistency between the command message and the state of the computer, then the terminal 260 is deactivated. Thirdly, the COM channel may disturb the bus by sending messages continuously or incoherently (babbling). If the primary (or secondary) computer detects transmission of that type, the faulty terminal 260 is deactivated. In general, in order to make provision against unwanted messages being sent or against interference between messages, provision can be made for each (COM or MON) channel of a terminal 260 to sign its messages with a distinct signature. Thus, the (primary or secondary) computer can easily authenticate the sender of the message and verify its integrity.

Deactivating a terminal 260 involves the associated actuator 230 being put into a damped (or passive) mode. Since a control surface 240 is generally moved by a plurality of actuators, the actuators adjacent to the actuator put into damped mode then take over therefrom. A terminal 260 may be deactivated merely by cutting off its power supply, where appropriate by means of a fieldbus (not shown).

Figure 2B:
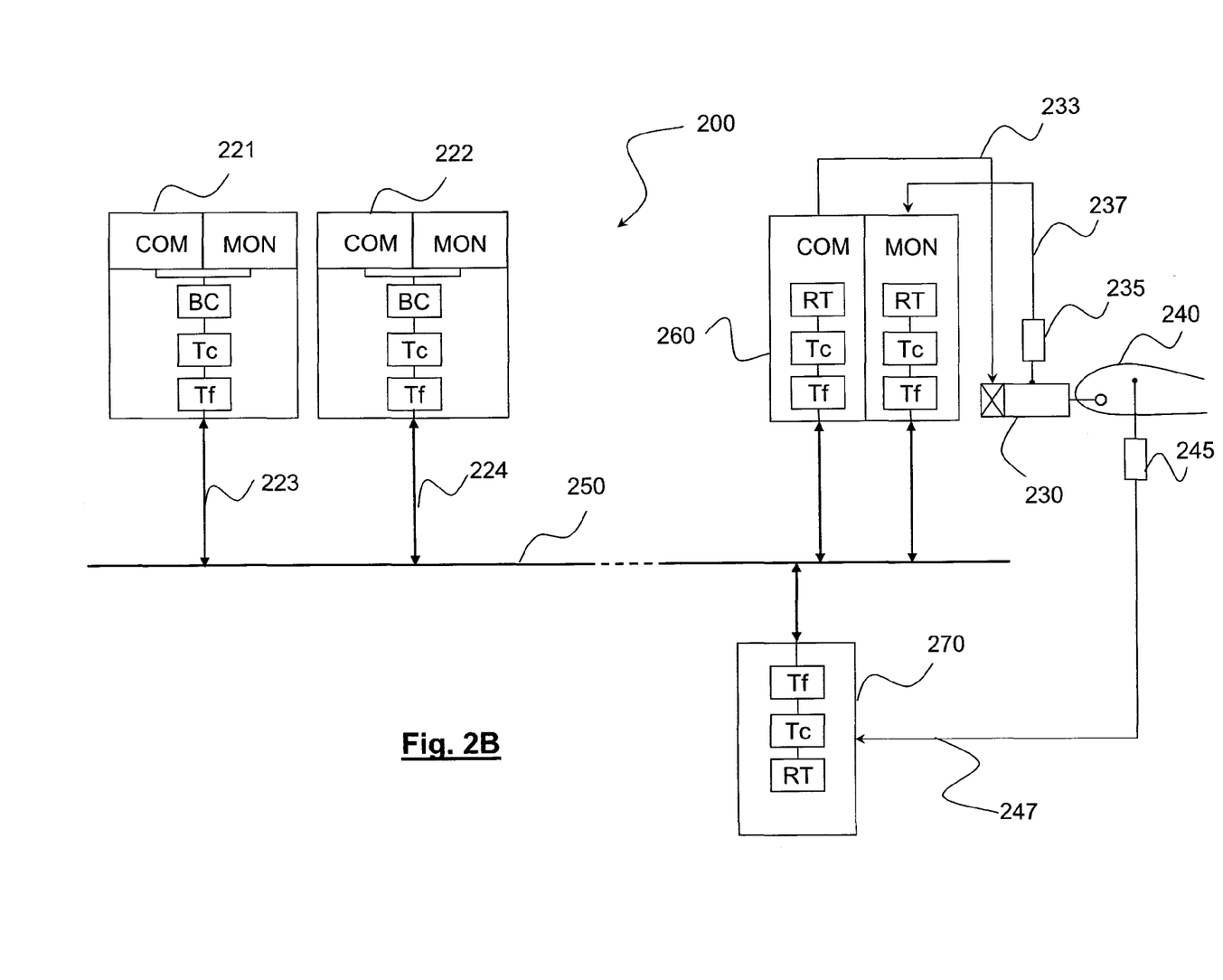

FIG. 2B shows a flight control system 200 in a second variant of the first embodiment of the invention.

This variant differs from that of FIG. 2A by the structure of the primary and secondary computers. In this structure, the bus controller BC is common to both the MON and COM channels of a computer. Each computer 221, 222 is then connected to the bus 250 via a single connection given a respective reference 223, 224. In this variant, the COM channel is no longer monitored directly by the MON channel by means of the messages passing over the bus, but rather by means of the messages that are sent and received by the common controller BC.

Figure 2C:
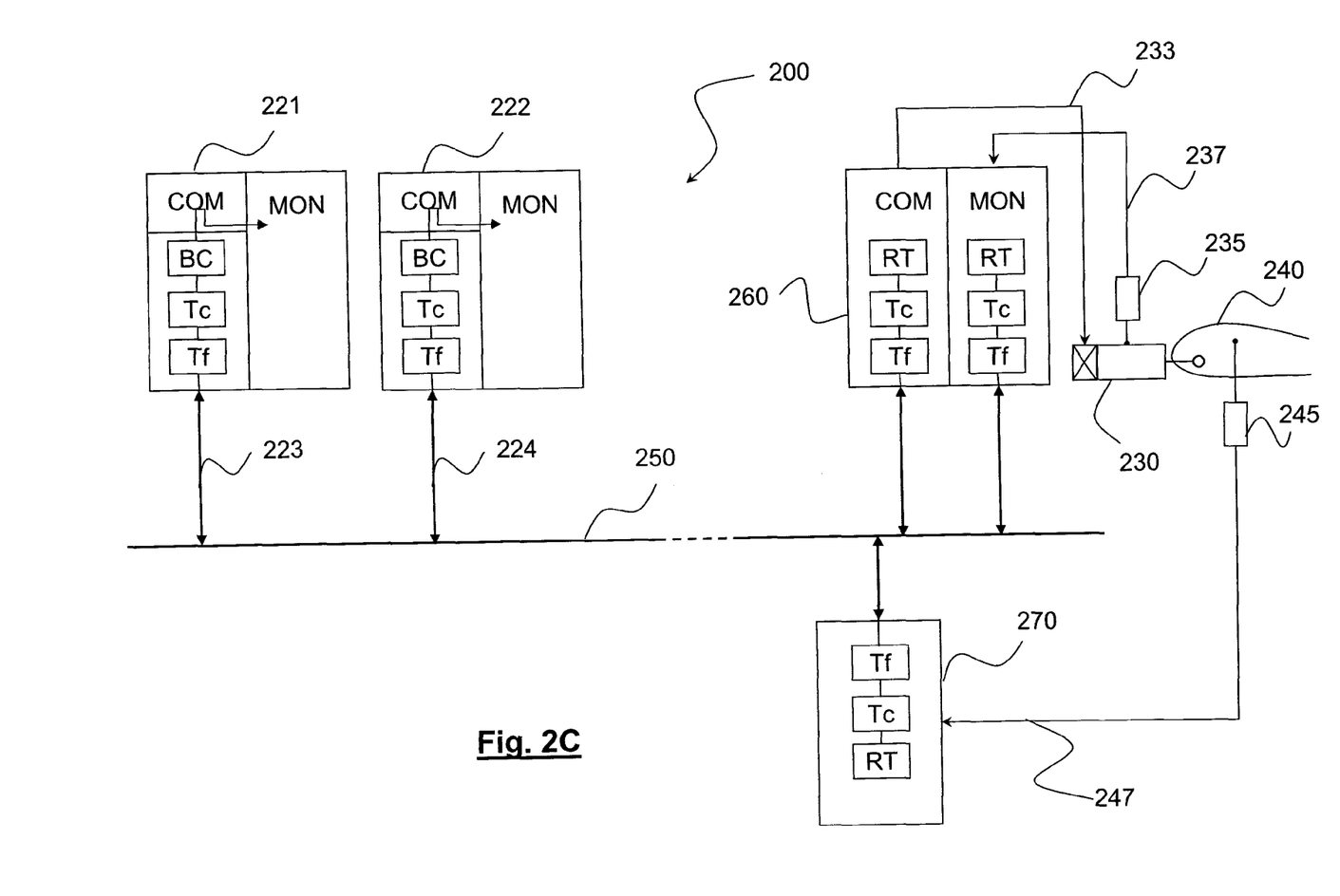

FIG. 2C shows a flight control system 200 in a third variant of the first embodiment of the invention.

As in the second variant, each computer has a single bus controller BC. Nevertheless, it is no longer shared between the COM and MON channels, but rather is dedicated to the COM channel. The connection with the bus 250 is made as before via a single connection 223, 224. In this variant, the COM channel is not monitored by the MON channel by means of the messages passing over the bus, but rather by means of the messages sent and received by the controller BC, as converted digitally by the COM channel and relayed to the MON channel.

Whereas in the first variants, blocking of the controller BC could be detected by the MON channel because the bus monitor module BM could always detect the same message being sent over the bus, such a diagnosis is no longer possible with the second and their variants. In order to mitigate this drawback, it is proposed that the COM channel signs its messages digitally using a key that varies over time in application of a predetermined relationship that is known both to the COM and to the MON channels. Thus, if the same message accompanied by the same signature is continuously being transmitted by the controller, the monitor module MON can deduce therefrom that the controller BC is faulty.

Figure 3:
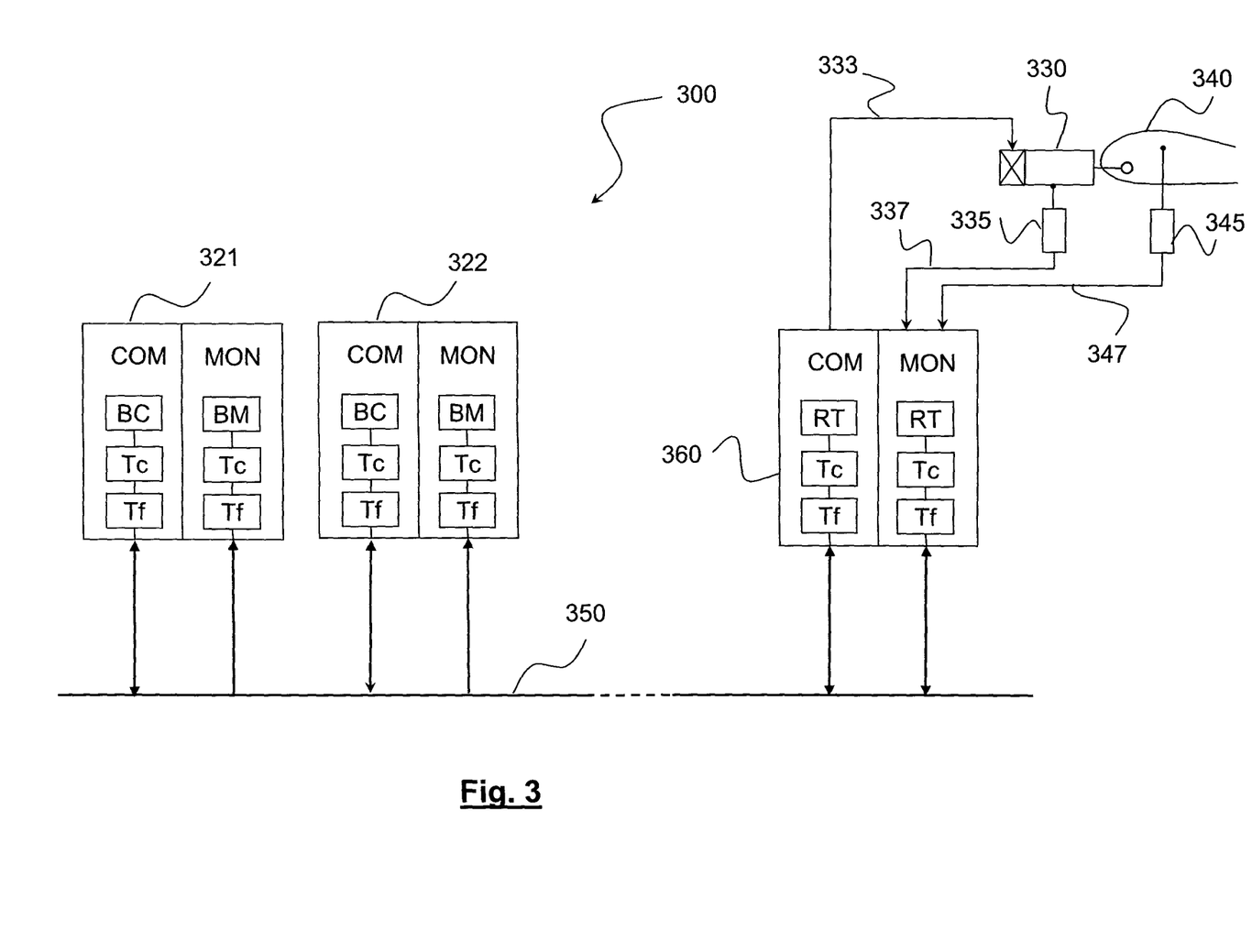
FIG. 3 shows a flight control system in a second embodiment of the invention.

FIG. 3 shows a flight control system 300 in a second embodiment of the invention. Reference numbers designating the same items as in FIGS. 2A to 2C are incremented by 100.

In this embodiment, the terminals 360 combine the functions that are provided by the terminals 260 and 270 in the first embodiment. In other words, the terminals 360 act both to control and monitor the actuators and also to monitor the control surfaces. The COM channel of the terminal 360 performs a function identical to that of the COM channel of the terminal 260. In contrast, the MON channel of the terminal acquires not only information relating to the state of the actuator 330 (position, hydraulic pressure, etc.), but also information relating to the state of the control surface 340 moved by the actuator (its position or its angular orientation). On request from the primary (or secondary) computer, the MON channel sends messages relating to the state of the actuator or to the state of the control surface.

The COM channel of the terminal is connected by a first cable 333 to transmit electrical orders to the actuator. The MON channel is connected via a second cable 337 to at least one sensor 335 of the actuator, and via a third cable 347 to a position/orientation sensor 345 of the control surface. All three cables 333, 337, and 347 are of length that is relatively short given the proximity of the terminal with the actuator-and-control surface assembly, so the cabling is small and relatively insensitive to electrical disturbances.

Like the first embodiment, the second embodiment may be presented in first, second, and third variants, depending on the structure of the primary and secondary computers, as described above.

Figure 4:
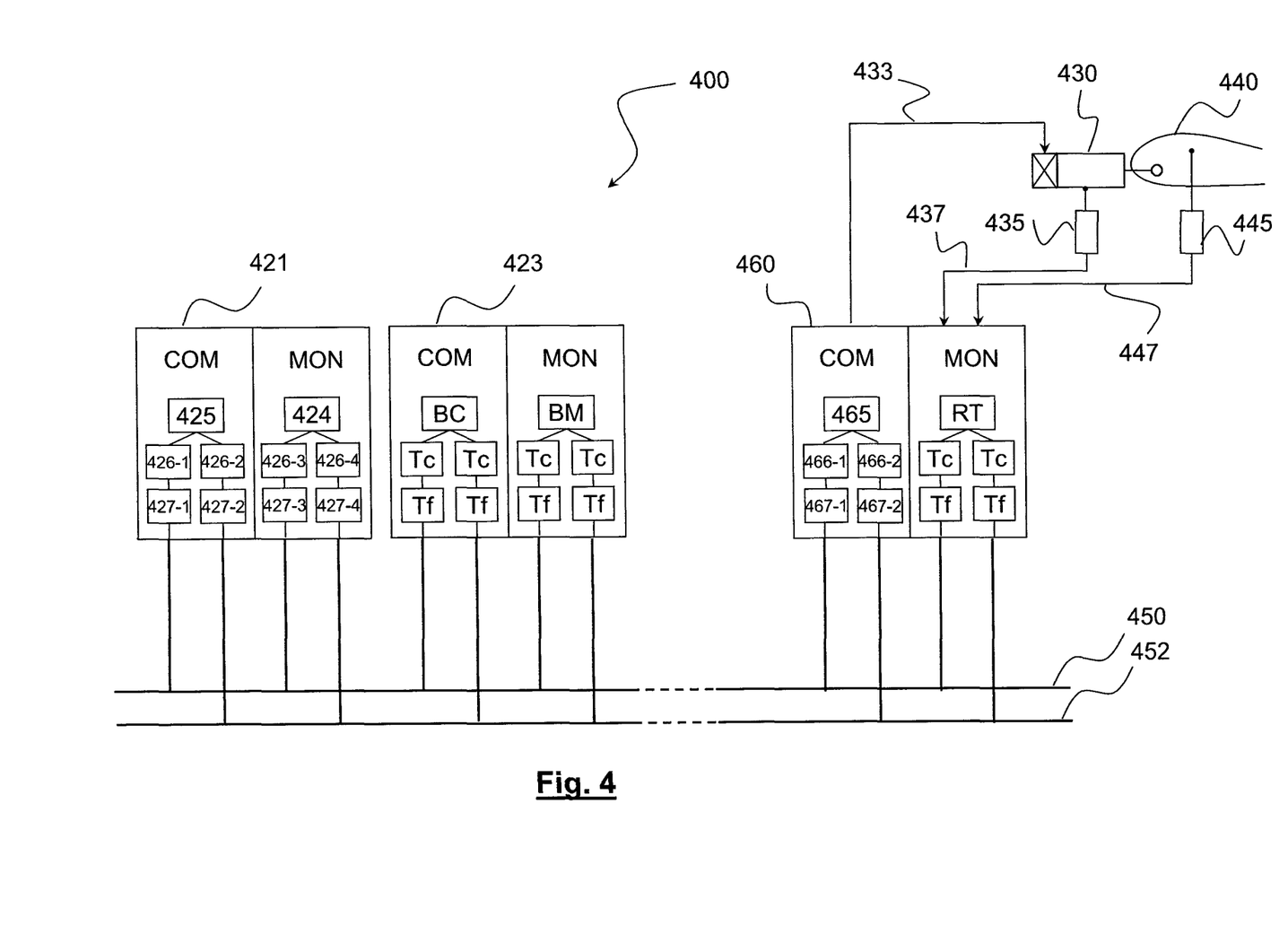
FIG. 4 shows a flight control system in a third embodiment of the invention.

FIG. 4 shows a flight control system in a third embodiment of the invention. In this embodiment, each of the COM and MON channels of the primary and secondary computers, and each of the remote terminals is duplicated, and each of the individual channels is connected to a distinct bus. More precisely, the flight control system 400 comprises a first bus 450 and a second bus 452, e.g. both in compliance with the MIL-STD-1553B standard. The buses 450 and 452 perform the same function as is performed by the bus 250 in FIG. 2A.

The COM channel of the primary computer 421 has a bus controller (BC) 425 connected to a first transceiver 426-1 and to a second transceiver 426-2 that operate in parallel, each transceiver being connected to a respective transformer 427-1, 427-2 serving to couple it with the first or the second bus, respectively. Similarly, the MON channel of the primary computer has a BM module 424 connected to a first transceiver 426-3 and to a second transceiver 426-4, each transceiver being connected via a respective transformer 427-3, 427-4 for coupling with the first or the second bus, respectively. The structure of the secondary computer is analogous to that of the primary computer, except that its COM channel may be inhibited in sending over the bus 450. Finally, the COM channel of a terminal 460, controlling an actuator 430 has an RT control module 465 connected to a first transceiver 466-1 and to a second transceiver 466-2, each transceiver being connected to a respective transformer 467-1 or 467-2 serving to couple it with the first or the second bus, respectively. The MON channel monitoring the state of the actuator and the state of the control surface is duplicated in the same manner.

In a variant not shown, the system 400 may include, as in the second embodiment, remote terminals that are dedicated to monitoring the control surfaces (cf. terminal 270 in FIG. 2A). Each of its terminals then has an RT control module connected to first and second transceivers, each transceiver itself being connected to a respective transformer providing coupling with the first or the second bus respectively.

Figure 5:
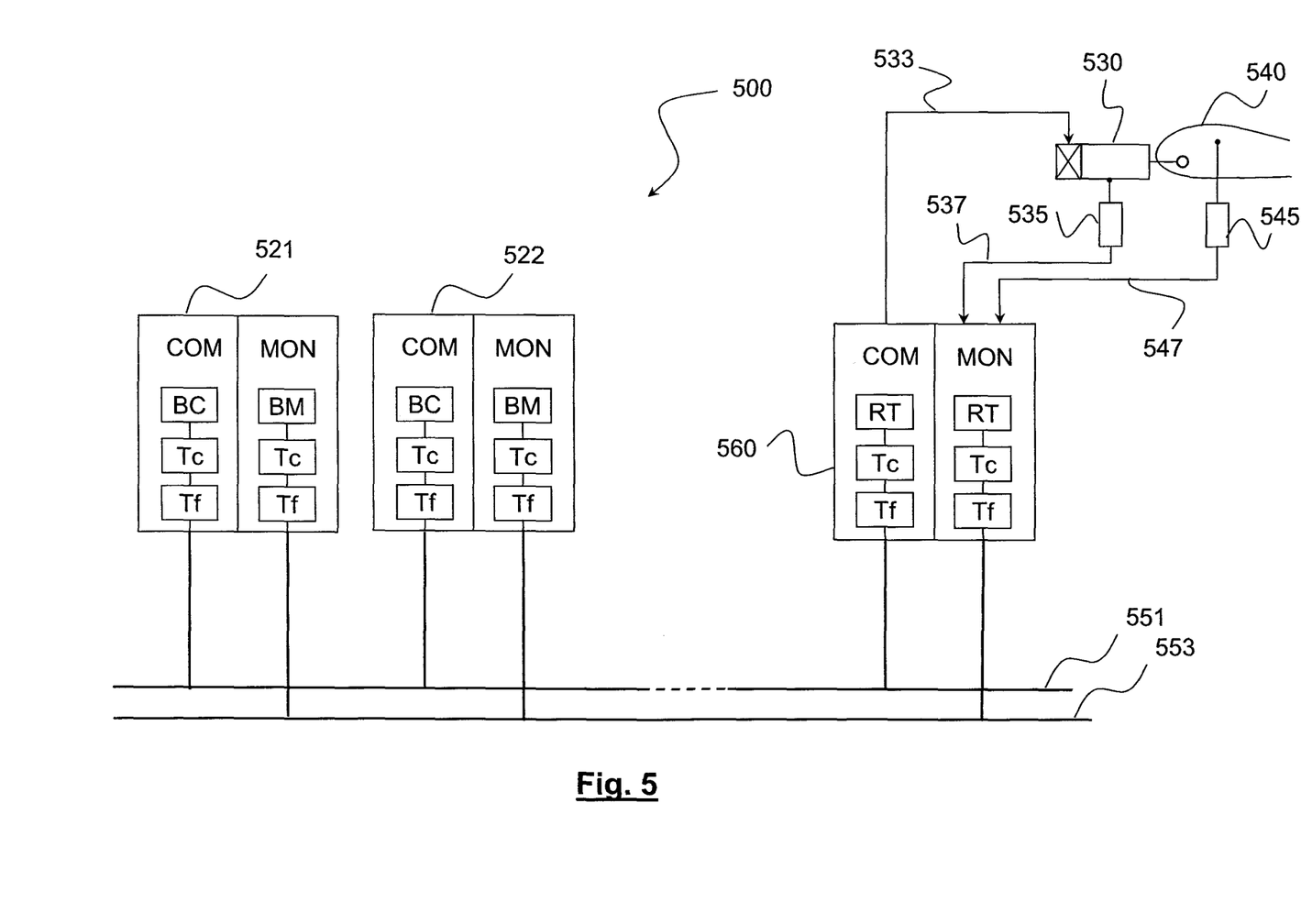
FIG. 5 is a diagram of a flight control system in a fourth embodiment of the invention.

FIG. 5 is a diagram of a flight control system in a fourth embodiment of the invention.

This embodiment differs from the first and second embodiments in that it has a first bus 551 dedicated to the COM channel and a distinct second bus 553 dedicated to the MON channel. In other words, the first bus is used for command message traffic from the computer and for the corresponding acknowledgments of receipt returned by the various terminals, while the second bus is used for request traffic from the computer and the actuator or control surface state messages returned by the various terminals.

It should be observed that the COM and MON channels of the primary computer have functions that are different from those of the first embodiment. Here the COM channel does no more than send command messages to the various terminals and receive acknowledgments of receipt. The MON channel does not listen to and therefore does not record the messages sent by or to the COM channel of the computer. In contrast, it transmits requests to the remote terminals 560 to discover the states of the actuators and of the control surfaces, and in return it receives corresponding state messages. Because it interrogates the various terminals, the MON channel has a bus controller BC controlling the bus 553, like the COM channel in which the bus controller BC controls the bus 551.

In a variant that is not shown, the flight control system may include terminals that are dedicated to monitoring, as in the first embodiment.

Figure 6:
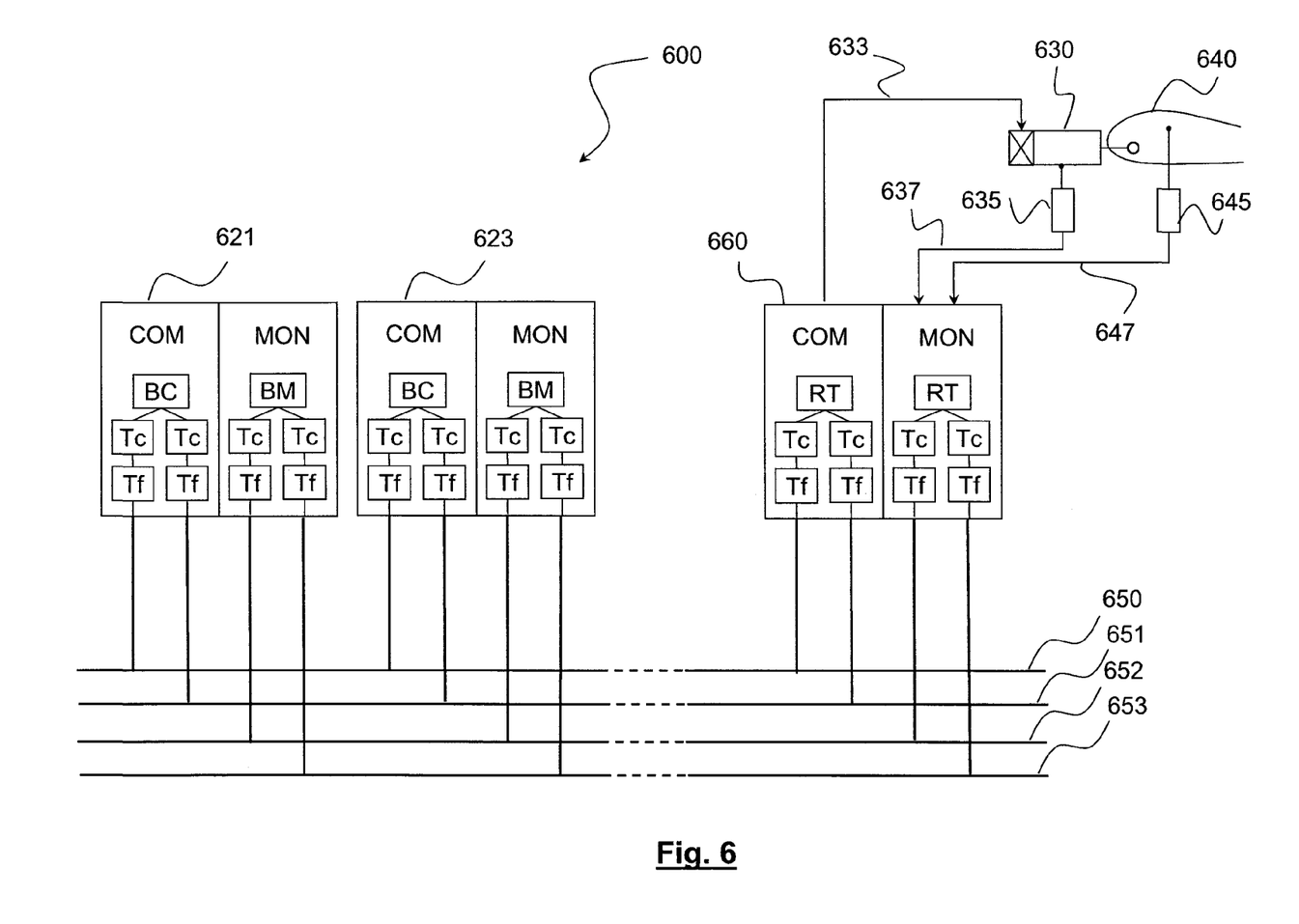
FIG. 6 is a diagram of a flight control system in a fifth embodiment of the invention.

FIG. 6 is a diagram of a flight control system in a fifth embodiment of the invention.

This embodiment is a combination of the third and fourth embodiments. More precisely, this flight control system has two COM channels and two MON channels that are duplicated, each individual COM channel and each individual MON channel having a distinct bus, giving four buses 651, 652, 653, and 654.

Figure 7:
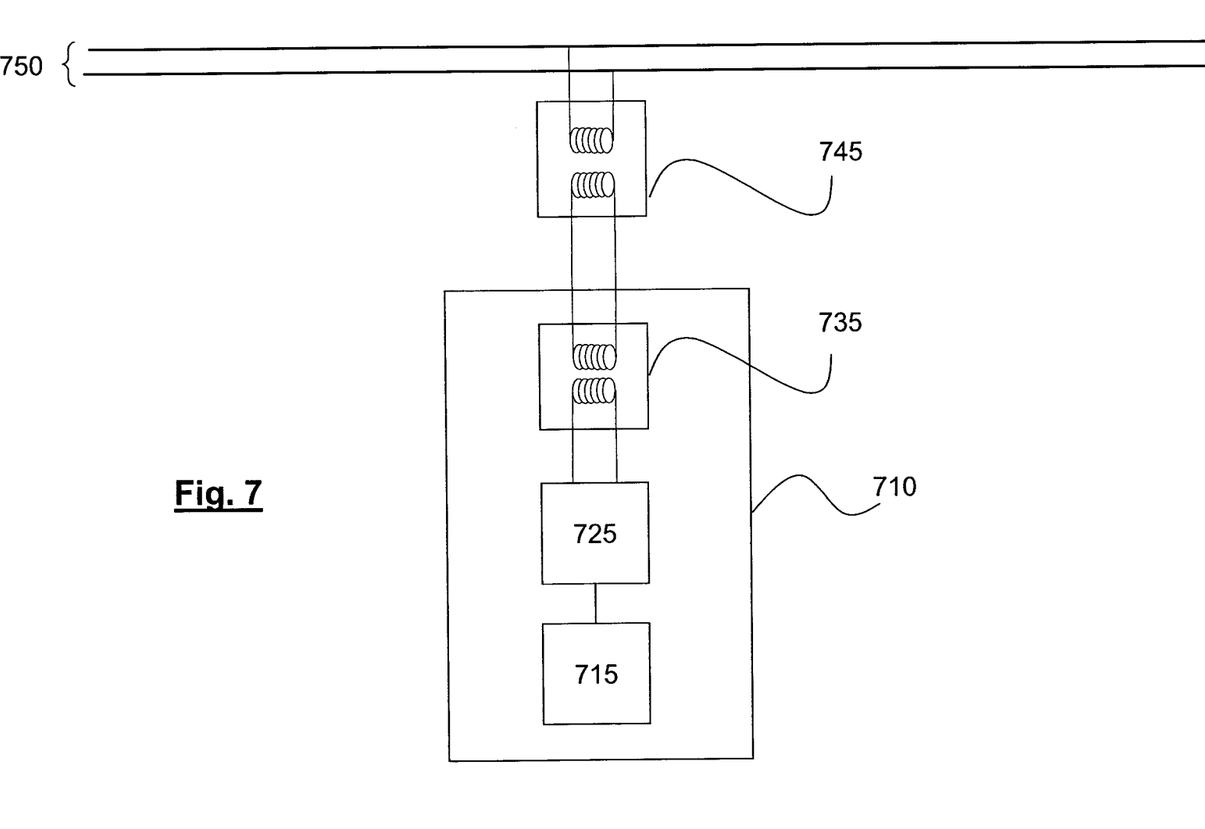
FIG. 7 shows a detail of the connection between a channel of a computer or a remote terminal and a bus.

FIG. 7 shows the detail of the connection between a COM or MON channel of a computer or of a terminal with a bus. It is recalled that the second and third variants of the first and second embodiments make use of only a single common connection between a computer and the bus. This connection is common to the COM and MON channels in the second variant, and is dedicated to the COM channel in the third variant.

As mentioned above, the channel 710 comprises a control module 715 (bus controller BC or bus monitor module BM for a computer, control module RT for a terminal), a transceiver 725, and a transformer 735.

The transformer 735 may be a unipolar signal transformer at the output from the bipolar signal transceiver, and vice versa. A second transformer 745 serves to isolate the channel 710 of the bus 750. It is recalled that the bus 750 is, in practice, implemented in the form of a twisted pair. The transformer 745 provides electrical isolation or decoupling between the computer or the terminal and the bus. This configuration has the particular advantage of avoiding both propagation of a high DC voltage from an actuator over the bus and the propagation in cascade of a short circuit over the bus. It also presents lower sensitivity to lightning than a configuration without electrical isolation or decoupling, which is particularly advantageous for new-generation aircraft that make use of composite materials and that consequently do not act as a Faraday cage.

The invention claimed is:

1. A flight control system for an aircraft for controlling a plurality of actuators configured to actuate corresponding control surfaces of the aircraft, the system comprising:
at least one communications bus;
at least one computer situated in an avionics bay of the aircraft, and configured to calculate flight commands and to transmit the calculated flight commands over said bus in the form of command messages;
at least a first remote terminal connected to said bus, configured to control a control surface actuator, to acquire a state of said control surface actuator from information provided by at least a first sensor coupled to the control surface actuator, to receive the command messages from the computer, to transmit electrical orders to said control surface actuator as a function of the received command messages, and to transmit messages to the computer, responsive to a first request of the computer, relating to the state of said control surface actuator as a function of the information provided by said first sensor; and at least one second remote terminal connected to said bus, configured to acquire a state of a control surface from information provided by a second sensor coupled to the control surface, and to transmit messages to the computer, responsive to a second request of the computer, relating to the state of said control surface as a function of information provided by said second sensor, wherein each said at least one computer includes a first channel and a second channel, said second channel being configured to monitor operation of said first channel.

2. An aircraft flight control system according to claim 1, wherein said bus is comprised of a differentially-powered twisted pair, and exchanges over said bus are performed in a half-duplex mode, using a master-slave protocol.

3. A flight control system according to claim 1, wherein said first channel is configured to calculate flight commands, to send the calculated flight commands as command messages, to a plurality of said first remote terminals, to receive acknowledgments of receipt from said first remote terminals, and to send requests to said first remote terminals to obtain in return respective states of corresponding control surface actuators respectively controlled by said first remote terminals and of control surfaces moved by the corresponding control surface actuators, and said second channel is configured to calculate flight commands, to transform the calculated flight commands into command messages, and to listen to and to record command messages passing over said bus, coming from and going to said first channel, and the command messages of said first channel are compared to the command messages of said second channel.

4. A flight control system according to claim 1, wherein the flight control system includes said bus as a single bus, said first channel is configured to calculate flight commands, to send the calculated flight commands as command messages to a plurality of said first remote terminals, to receive acknowledgments of receipt from said first remote terminals, and to send requests to said first remote terminals to obtain in return respective states of corresponding control surface actuators respectively controlled by said first remote terminals and of control surfaces moved by the corresponding control surface actuators, said first channel being connected to said bus via a connection that is controlled by a bus controller, said second channel is connected to said bus controller, and is configured to calculate flight commands and to transform the calculated flight commands into command messages, and to listen to and to record command messages transmitted and received from said bus controller, coming from and going to said first channel, and the command messages of said first channel are compared to the command messages of said second channel.

5. A flight control system according to claim 1, wherein the flight control system includes said bus as a single bus, said first channel is configured to calculate flight commands, to send the calculated flight commands as command messages to a plurality of said first remote terminals, to receive acknowledgments of receipt from said first remote terminals, and to send requests to said first remote terminals to obtain in return respective states of corresponding control surface actuators respectively controlled by said first remote terminals and of control surfaces moved by the corresponding control surface actuators, said first channel being connected to said bus via a connection that is controlled by a bus controller, said second channel is connected to said first channel and is configured to calculate flight commands and to transform the calculated flight commands into command messages, to receive messages from and to said first channel, relayed from said first channel to said second channel, and the command messages of said first channel are compared to the command messages of said second channel.

6. A flight control system according to claim 3, wherein said first remote terminal includes:

a first channel configured to receive command messages from the computer, to acknowledge receipt of the received command messages, and to transmit electrical orders to said control surface actuator controlled by said first remote terminal; and a second channel configured to receive requests from the computer and to return messages relating to at least one of the state of said control surface actuator and the state of said corresponding control surface movable by said control surface actuator.

7. A flight control system according to claim 6, wherein said first and second channels of the computer and said first and second channels of said first remote terminal are connected to said bus as a single bus.

8. A flight control system according to claim 7, wherein said first channel of the computer includes a bus controller in series with a first transceiver and a first transformer providing coupling to said bus, said second channel of the computer includes a bus monitor module in series with a second transceiver and a second transformer providing coupling to said bus, and each of said first and second channels of said first remote terminal includes a control module in series with a third transceiver and a third transformer providing coupling to said bus.

9. A flight control system according to claim 6, wherein said at least one communications bus includes a first bus and a second bus, said first channel of the computer and said first channel of said first remote terminal are connected to said first bus, and said second channel of the computer and said second channel of said first remote terminal are connected to said second bus.

10. A flight control system according to claim 9, wherein each of said first and second channels of the computer includes a bus controller in series with a first transceiver and a first transformer providing coupling to said first and second buses, respectively, and each of said first and second channels of said first remote terminal includes a control module in series with a second transceiver and a second transformer providing coupling to said first and second buses, respectively.

11. A flight control system according to claim 6, wherein said at least one communications bus includes a first bus and a second bus, said first channel of said computer includes a bus controller in series with two first branches in parallel, each said first branch having a first transceiver in series with a first transformer for coupling said first bus to said second bus, said second channel of said computer includes a monitor module in series with two second branches in parallel, each said second branch having a second receiver in series with a second transformer for providing coupling to said first and second buses, respectively, and each of said first and second channels of said first remote terminal includes a control module in series with two third branches in parallel, each said third branch having a third transceiver in series with a third transformer for providing coupling to said first and second buses, respectively.

12. An aircraft having a plurality of said control surfaces configured to be operated by corresponding ones of said control surface actuators, the aircraft comprising the flight control system according to claim 1.

13. A flight control system according to claim 1,
wherein said at least one computer includes said computer and another identical computer, said computer being a primary flight control computer and said another computer being a secondary flight control computer, and
wherein, in a normal operation mode said first channel of said another computer is inhibited from outputting the command messages to said bus.

14. A flight control system according to claim 13,
wherein, when a malfunction affects said first channel of said computer, the malfunction is detected by said second channel of said computer, and said computer is deactivated by said second channel of said computer, and
responsive to the deactivation of said computer, said another computer is activated as the primary flight control computer.

15. A flight control system for an aircraft for controlling a plurality of actuators configured to actuate corresponding control surfaces of the aircraft, the system comprising:
at least one communications bus;
at least one computer situated in an avionics bay of the aircraft, and configured to calculate flight commands and to transmit the calculated flight commands over said bus in the form of command messages; and
at least a first remote terminal connected to said bus, configured to control a control surface actuator, to acquire a state of said control surface actuator from information provided by at least a first sensor coupled to the control surface actuator, to transmit electrical orders to said control surface actuator as a function of the received command messages, to transmit messages to the computer, responsive to a first request of the computer, relating to the state of the control surface actuator as a function of the information provided by said first sensor,
wherein the first remote terminal is also configured to acquire a state of a control surface moved by said actuator from information provided by at least one second sensor coupled to the control surface, and to transmit messages to the computer, responsive to a second request of the computer, relating to the state of said control surface as a function of information provided by said second sensor, and
each said at least one computer includes a first channel and a second channel, said second channel being configured to monitor operation of said first channel.

16. A flight control system according to claim 15,
wherein said at least one computer includes said computer and another identical computer, said computer being a primary flight control computer and said another computer being a secondary flight control computer, and
wherein, in a normal operation mode said first channel of said another computer is inhibited from outputting the command messages to said bus.

17. A flight control system according to claim 16,
wherein, when a malfunction affects said first channel of said computer, the malfunction is detected by said second channel of said computer, and said computer is deactivated by said second channel of said computer, and
responsive to the deactivation of said computer, said another computer is activated as the primary flight control computer.

* * * * *